United States Patent
Carl

(12) United States Patent (10) Patent No.: US 7,984,557 B1
Carl (45) Date of Patent: Jul. 26, 2011

(54) LASER-GUIDED POSITIONING DEVICE

(76) Inventor: Keith D. Carl, Cincinnati, OH (US)

( * ) Notice: Subject to any disclaimer, the term of this patent is extended or adjusted under 35 U.S.C. 154(b) by 221 days.

(21) Appl. No.: 12/455,601

(22) Filed: Jun. 5, 2009

(51) Int. Cl.
*G01C 3/00* (2006.01)
*G01C 5/00* (2006.01)
*G01B 11/00* (2006.01)

(52) U.S. Cl. .................. 33/263; 33/286; 33/DIG. 21

(58) Field of Classification Search .............. 33/263, 33/264, 276, 277, 282, 284, 286, 700, 701, 33/DIG. 21; 356/3.1
See application file for complete search history.

(56) References Cited

U.S. PATENT DOCUMENTS

| | | | | |
|---|---|---|---|---|
| 2,316,751 | A * | 4/1943 | Alder, Jr. ................. 356/3.1 |
| 4,142,798 | A | 3/1979 | Barbee, Jr. ............... 356/138 |
| 4,257,706 | A * | 3/1981 | Smith ....................... 356/3 |
| 4,281,342 | A | 7/1981 | Ueda et al. ............... 348/94 |
| 4,396,945 | A | 8/1983 | DiMatteo et al. ....... 348/139 |
| 4,696,574 | A | 9/1987 | Penney ..................... 356/614 |
| 4,744,664 | A | 5/1988 | Offt et al. ................. 356/615 |
| 4,836,671 | A | 6/1989 | Bautista ................... 356/3.1 |
| 4,908,948 | A * | 3/1990 | Gormley ................... 33/276 |
| 5,144,487 | A * | 9/1992 | Hersey ..................... 359/629 |
| 5,335,308 | A | 8/1994 | Sorensen .................. 392/412 |
| 5,363,185 | A | 11/1994 | Zana ......................... 356/2 |
| 5,383,524 | A * | 1/1995 | Rinnemaa ................. 173/1 |
| 5,403,142 | A | 4/1995 | Stewart .................... 414/392 |
| 5,757,500 | A | 5/1998 | Rueb ......................... 356/620 |
| 6,115,129 | A | 9/2000 | Holmquist et al. ....... 356/615 |
| 6,202,013 | B1 * | 3/2001 | Anderson et al. ......... 701/50 |
| 6,250,588 | B1 * | 6/2001 | Numbers et al. .......... 244/134 C |
| 6,480,271 | B1 | 11/2002 | Cloud et al. .............. 356/152.1 |
| 6,493,952 | B1 * | 12/2002 | Kousek et al. ............ 33/286 |
| 6,662,457 | B2 * | 12/2003 | Dameron ................... 33/286 |
| 6,693,702 | B2 | 2/2004 | Rogers ...................... 356/3.1 |
| 6,874,739 | B1 * | 4/2005 | Gregory .................... 248/188.4 |
| 6,877,236 | B1 * | 4/2005 | Williams ................... 33/286 |
| 6,894,621 | B2 | 5/2005 | Shaw ......................... 340/685 |
| 6,966,525 | B1 * | 11/2005 | Schroeder ................. 244/135 A |
| 7,037,006 | B2 * | 5/2006 | Chapman .................. 396/428 |
| 7,244,464 | B2 | 7/2007 | Robens et al. ............ 427/8 |
| 7,270,593 | B2 | 9/2007 | Klein, II et al. .......... 451/6 |
| 7,375,621 | B1 * | 5/2008 | Hines ........................ 340/435 |
| 7,434,322 | B2 * | 10/2008 | Walser et al. .............. 33/286 |
| 7,472,009 | B2 * | 12/2008 | Baldwin .................... 701/50 |
| 2007/0025832 | A1 | 2/2007 | Rawdon et al. ........... 414/401 |

FOREIGN PATENT DOCUMENTS

| JP | 01044808 A * | 2/1989 |
| WO | WO 9009560 A1 * | 8/1990 |
| WO | WO 2010126983 A1 * | 11/2010 |

* cited by examiner

*Primary Examiner* — R. A. Smith
(74) *Attorney, Agent, or Firm* — Alfred J. Mangels

(57) ABSTRACT

A positioning device for enabling a user to accurately position the outermost end of an extendable member, such as an extension ladder, relative to a fixed, elevated position. The device includes laser light sources that provide angularly disposed laser light beams that terminate at desired points when the outermost end of the extendable member is adjacent to the desired end position. A first laser light beam is arranged to extend parallel to the longitudinal axis of the extendable member, and a second laser light beam is arranged to extend at a predetermined angle relative to the first laser light beam.

12 Claims, 12 Drawing Sheets

LASER-GUIDED POSITIONING DEVICE

BACKGROUND OF THE INVENTION

1. Field of the Invention

The present invention relates to a positioning device for attachment to an extendable member in order to enable a user to easily and accurately position the outermost end of the extendable member adjacent to a desired end position.

2. Description of the Related Art

The accurate positioning of the outermost end of an aerial extension ladder of the type utilized in firefighting vehicles is often difficult because of the considerable distance between the operator who is controlling positioning of the aerial ladder and the outer end of the ladder. At full extension, typical aerial ladders are capable of reaching vertical heights of up to about 110 feet or more, depending upon the particular ladder design. That considerable distance renders it difficult for the operator of the ladder positioning controls to assess how close the outermost end of the extending aerial ladder is relative to its intended destination position. The destination position can be adjacent to a window, to allow entry of a firefighter to a building through the window or to permit the rescue of a person who is at the building window, or it can be the roof of a building. The destination position can also be spaced from a building wall a desired distance to allow a hose nozzle at the end of the ladder to be properly oriented to direct water at the fire at an elevated level. The destination position can also be a position at which an aerial platform is desired to be located.

Because of the difficulty for an aerial ladder operator located at the base of the ladder to assess the position of the outermost end of the extended ladder relative to a desired destination position, another firefighter is often positioned at the base of the structure to act as a spotter. The spotter is spaced from the base of the ladder to visually detect how close the end of the ladder is relative to the wall or structure, and to provide a signal to the ladder operator to enable him to adjust the amount of ladder extension as necessary. Thus, the ladder operator must simultaneously monitor the ladder controls, the position of the outermost end of the ladder, and the instructions provided by the spotter. However, the use of another person on the ground as a spotter, rather than as one fighting the fire, takes from the fire scene a person who could otherwise assist in fighting the fire itself in some other capacity.

There is therefore a need for a device to enable an aerial ladder operator to himself more accurately assess the outermost position of the extended ladder, without the need for a spotter.

SUMMARY OF THE INVENTION

Briefly stated, in accordance with one aspect of the present invention, a positioning device is provided for enabling an operator to guide an outer end of a longitudinally movable extendable member to a desired position relative to a substantially vertically-extending surface, such as a building wall, or to a position on an angularly disposed surface. The positioning device includes a housing having first and second openings that have respective axes that are angularly disposed relative to each other, wherein the axes of the openings lie in a common plane. A first laser light source is positioned within the housing for directing a first laser light beam through the first opening in the housing, and a second laser light source is positioned within the housing for directing a second laser light beam through the second opening in the housing.

The first laser light source projects a first laser light beam that extends parallel to the longitudinal movement direction of the extendable member. The first laser light beam provides a first predetermined laser light image that impinges on the substantially vertically-extending or angularly-disposed surface at a desired position toward which the outer end of the extendable member is to be longitudinally extended. The second laser light source projects a second laser light beam that provides a second predetermined laser light image on the substantially vertically-extending surface and in a direction that is angularly offset from the direction of the first laser light beam, so that the first and second light images on the surface nearly converge as the end of the extendable member approaches the desired end point. The housing of the positioning device is attached to the extendable member at a point adjacent to its outer end.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
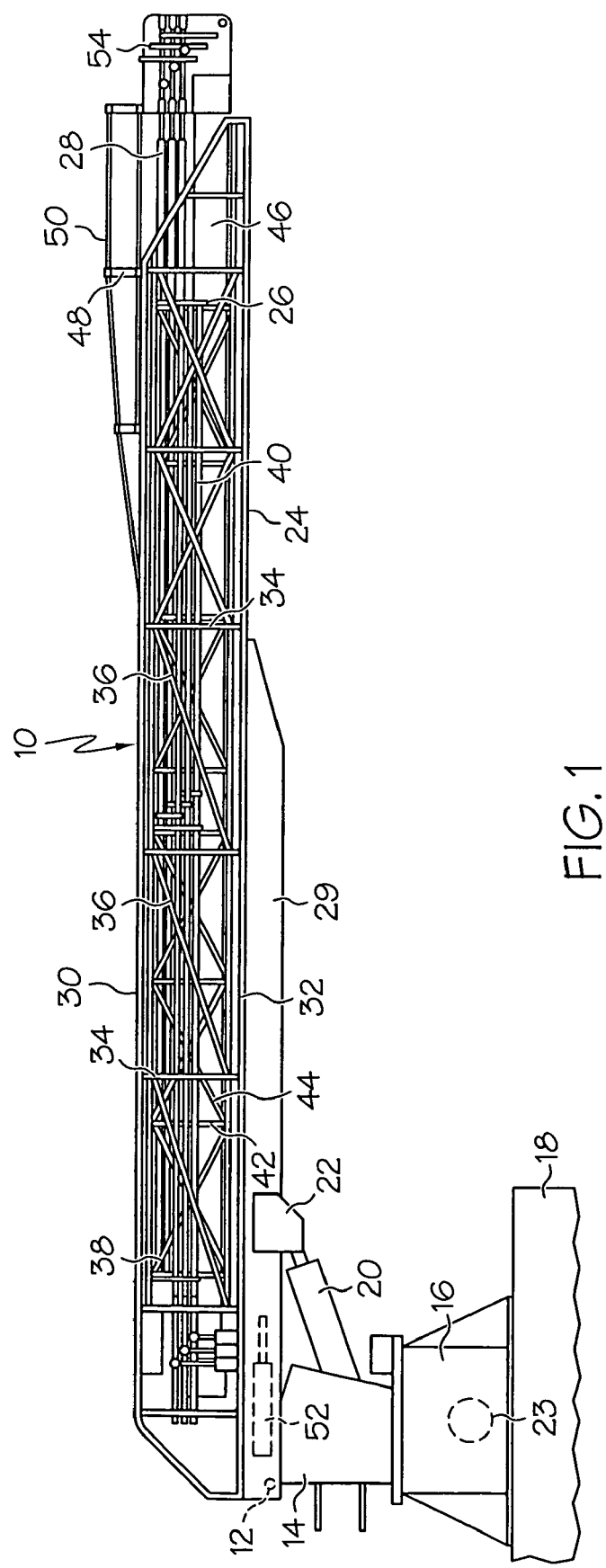
FIG. 1 is a side view of an extendable aerial ladder of the type carried by a fire truck and including a positioning device in accordance with the present invention.

Referring now to the drawings in more detail and initially to FIG. 1, reference numeral 10 generally designates a three-section aerial ladder. The base end of the ladder 10 is pivotally mounted by a hinge 12 to a turret 14 that is, in turn, mounted for rotation on a stationary pedestal 16 secured to a truck bed 18. The hinge 12 provides a horizontal axis about which the outer end of the ladder can be pivoted in order to vary the angle of the ladder relative to the horizontal, and so that the outer end of the ladder can be raised and lowered. The pivotal movement of the ladder about hinge 12 is controlled by a hydraulic cylinder 20 having its base end secured to and pivotally supported by the turret 14. The extendable rod end of cylinder 20 is pivotally connected to a cross member (not shown) that extends between a pair of laterally spaced brackets 22 that are secured to the ladder. Extension and retraction of the rod of cylinder 20 pivots the ladder 10 about the horizontal axis of hinge 12 to cause the outer end of the ladder to move up or down relative to truck bed 18.

A hydraulic motor 23 and an associated motor drive system of conventional construction serve to rotate the turret 14 about a vertical axis of rotation in order to vary the rotational position of the ladder with respect to the stationary pedestal 16. The rotational drive system can be of any suitable type, and it serves to rotate the turret 14 through a full 360° circle when the system is in the rotational mode of operation.

The aerial ladder 10 includes a lower, bed section 24, a middle or intermediate section 26, and an upper, fly section 28. The lower bed section 24 has its base end pivotally connected to the turret 14, and it includes reinforcing longitudinally-extending structural support panels 29 to which the brackets 22 are secured. The lower, bed section also includes parallel opposite sides formed by upper and lower rails 30 and 32, between which vertical bars 34 extend at spaced intervals. Inclined bars 36 extend between each pair of vertical bars 34. Horizontal bars (not shown) extend between the opposed lower rails 32 at parallel, spaced intervals to form the usual ladder rungs (not shown).

The middle section 26 is received within and is of similar construction as that of the lower bed section 24, but it is not as wide. Opposite sides of middle section 26 include upper and lower rails 38 and 40, with vertical bars 42 extending between the upper and lower rails, and inclined bars 44 extending between the vertical bars 42. Ladder rungs (not shown) extend between the opposed lower rails 40.

The middle section 26 is longitudinally movable relative to lower section 24, so that it can extend and retract relative to the lower section. The sides of the main portion of the middle section are located inwardly of the sides of the lower bed section, and the lower rails 40 and rungs (not shown) of the middle section are located slightly above the lower rails 32 and rungs of the lower bed section. The middle section 26 thus nests within the lower bed section 24 when the ladder is fully retracted, as shown in FIG. 1. When the ladder is extended, the middle section extends outwardly from the lower section and forms a continuation thereof.

The upper, fly section 28 has parallel rectangular side beam sections 46 on its opposite sides, between which spaced rungs (not shown) extend. Extending upwardly from the beam sections 46 are vertical posts 48. Rods 50 are supported by the posts 48 to form handrails for workers on the upper fly section and also to act as truss rods. The rods 50 are located on the portion of the upper fly section that extends out of the middle ladder section when the ladder is fully extended.

The upper, fly section 28 is somewhat narrower than the middle section 26, and it extends out of and retracts into the middle section when the ladder is extended and retracted. The side beams 46 of upper fly section 28 are closer together than are the sides of the middle ladder section 26, and the rungs of the upper ladder section are slightly above the rungs of the middle ladder section. When the ladder is in the fully retracted condition shown in FIG. 1, the upper ladder section 28 nests within the middle ladder section 26.

Extension and retraction of the ladder sections relative to each other is effected by a hydraulic cylinder 52 that can be combined with a conventional cable and pulley system (not shown) in order to cause the ladder sections to extend relative to one another when the rod of cylinder 52 is extended, and to retract into one another in nested relationship when the rod of cylinder 52 is retracted.

Figure 2:
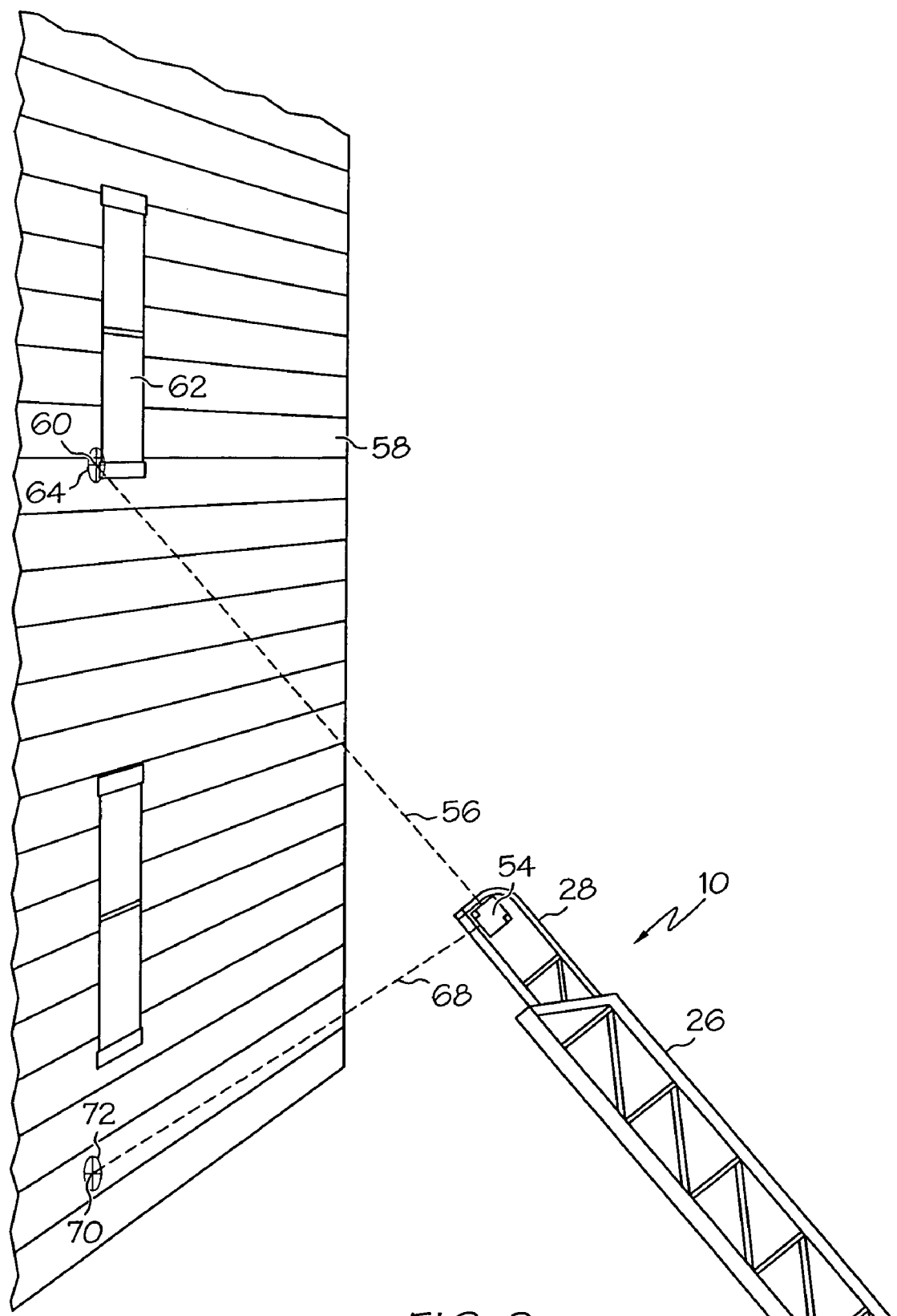
FIG. 2 is a view showing the extendable aerial ladder of FIG. 1 adjacent to and aimed at a building wall after the ladder has been pivoted from its horizontal position but before it has been extended, and with light images projected onto the building wall by the positioning device.

A positioning device 54 is provided adjacent the outermost end of upper ladder section 28 and is suitably attached thereto. As shown in FIG. 2, positioning device 54 emits a first laser beam 56 that is directed parallel to the direction of extension of ladder 10. First laser beam 56 impinges upon a structure wall 58 at a predetermined first beam impingement point 60, which is adjacent to the desired destination point of the outermost end of the ladder when it is extended, and which is shown in FIG. 2 as next to a window 62. Impingement point 60 of first beam 56 defines on the surface of building wall 58 a visible first laser beam image 64. Positioning device 54 also emits a second laser beam 68, one that is directed perpendicular to the direction of first laser beam 56 and that impinges upon the surface of building wall at a second beam impingement point 70, to define on the building wall a visible second laser beam image 72.

With respect to the laser beams intended for use in positioning an extension ladder by providing images that appear on a building wall, laser beams are generally tightly collimated, narrow beams of laser light that result in images that have a small area. However, when the ladder is being extended, or when it is occupied by a person who is moving along the ladder, the movement of the ladder as it is being extended, as well as the movement of a person along an already extended ladder, typically results in some degree of vibration or movement of the outermost end of the ladder. As a result of that movement of the ladder outermost end, the laser beam images 64, 72 are not stationary points but describe on the building wall rapidly moving light patterns that correspond the ladder outermost end vibration or movement pattern. Consequently, there are provided on the building wall enlarged beam impingement images 64, 72 of random forms, depending upon the direction and speed of movement at the outermost end of the ladder, and which are represented for illustrative purposes in each of FIGS. 2, 3, and 4 as the crosshair images within a circle.

Figure 3:
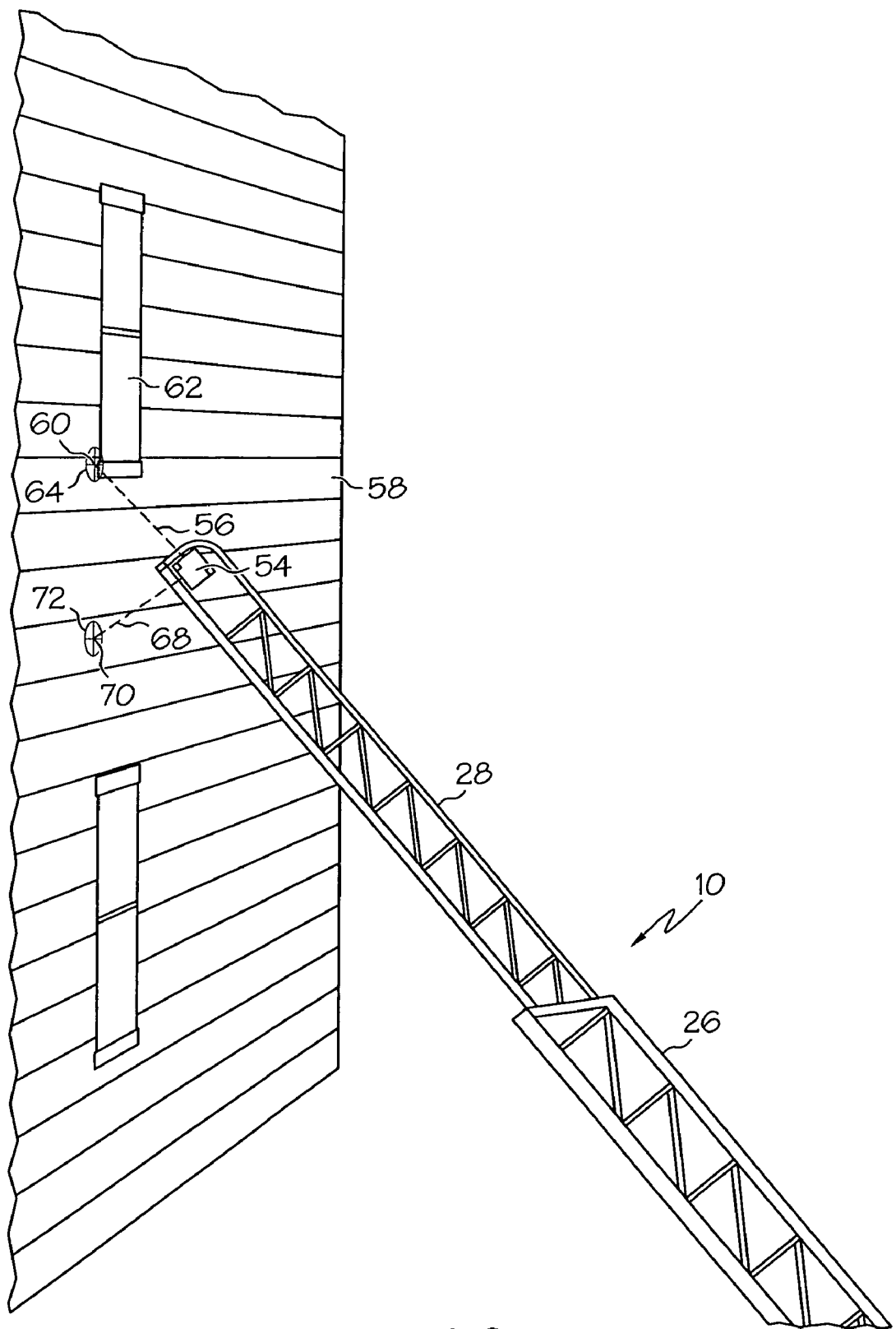
FIG. 3 is a view similar to that of FIG. 2 showing the aerial ladder partially extended and with the positions of the light images projected onto the building wall by the positioning device.
Figure 4:
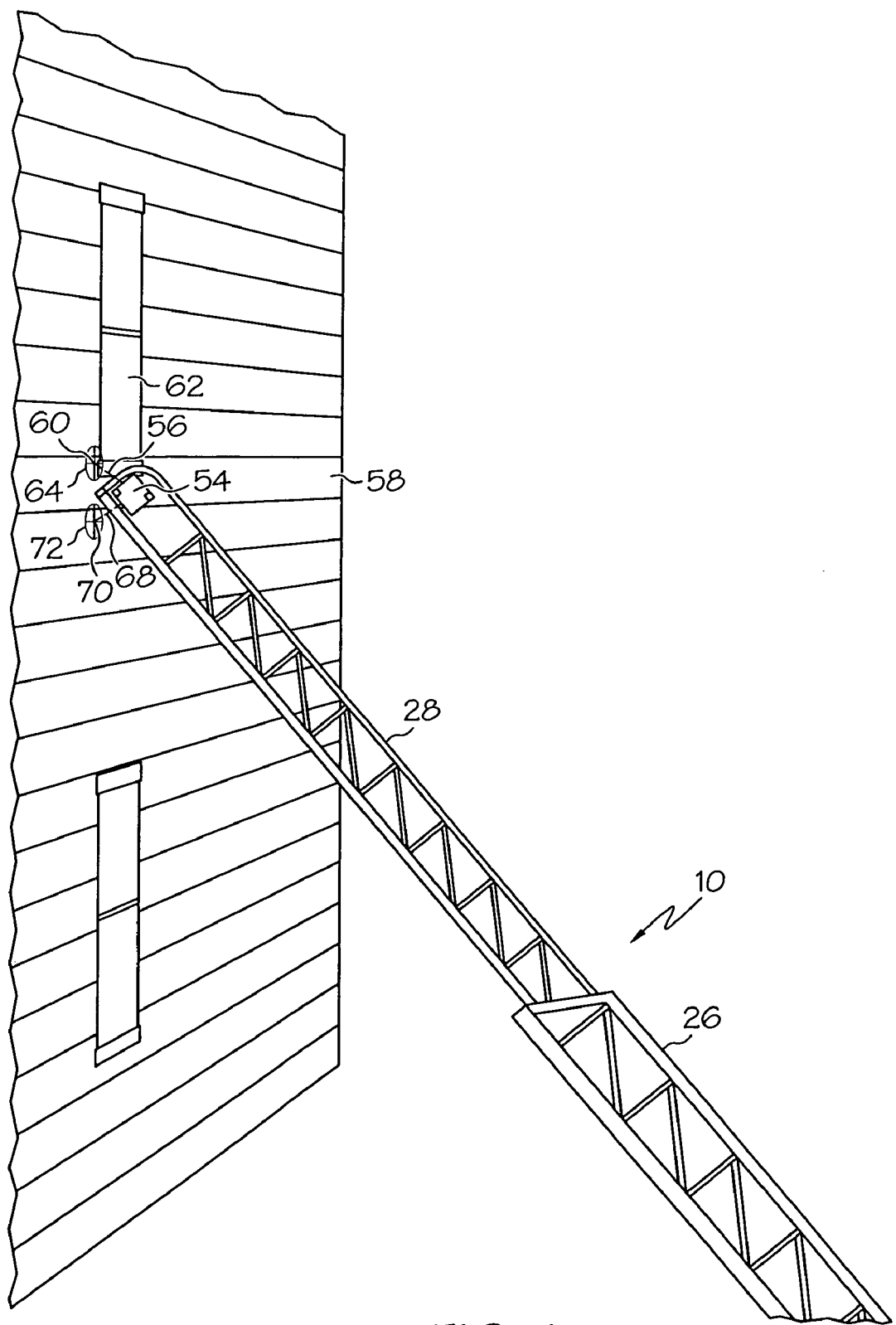
FIG. 4 is a view similar to those of FIGS. 2 and 3 showing the ladder extended to its desired position relative to a window, along with the positions of the light images projected by the positioning device.

As the outermost end 28 of ladder 10 is extended outwardly toward building wall 58, as shown in FIG. 3, first laser beam image 64 remains adjacent the desired endpoint of the extended ladder. At the same time, during that outward movement of the ladder toward the desired endpoint, second laser beam image 72 moves upwardly along the surface of building wall 58 and toward the first laser beam image. Outward extension of the ladder 10 continues until first and second laser beam images 64, 72 move closer together to be within a predetermined spacing from each other, as shown in FIG. 4, which indicates to the ladder operator that the ladder outermost end has reached a position close to the desired end position adjacent to window 62 at building wall 58. The use of positioning device 54 thus enables the ladder operator to devote his full, undivided attention to properly orienting the ladder relative to a desired end point and to extend the ladder toward the desired end point, and without the distractions resulting from having to receive instructions or information from a spotter on the ground adjacent to the lower part of the building wall. The formerly used spotter can therefore be advantageously assigned to perform other, more productive activities.

With regard to the laser beams that emanate from positioning device 54, laser light sources are available to provide laser light having different colors, depending upon the wavelength of the laser light provided by the laser light source. A laser light color that has been found to be effective for the purposes described herein is a green laser having a laser light wavelength of 532 nm. However, other laser light sources that emit laser light at different wavelengths can also be utilized.

Figure 5:
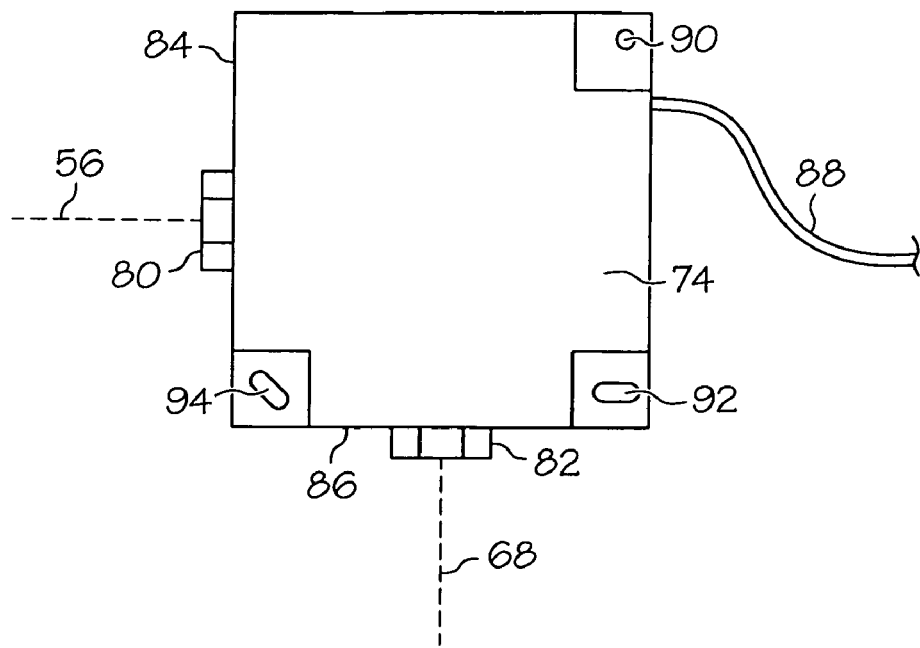
FIG. 5 is a top view of the exterior of a housing of a first embodiment of a positioning device in accordance with the present invention.
Figure 6:
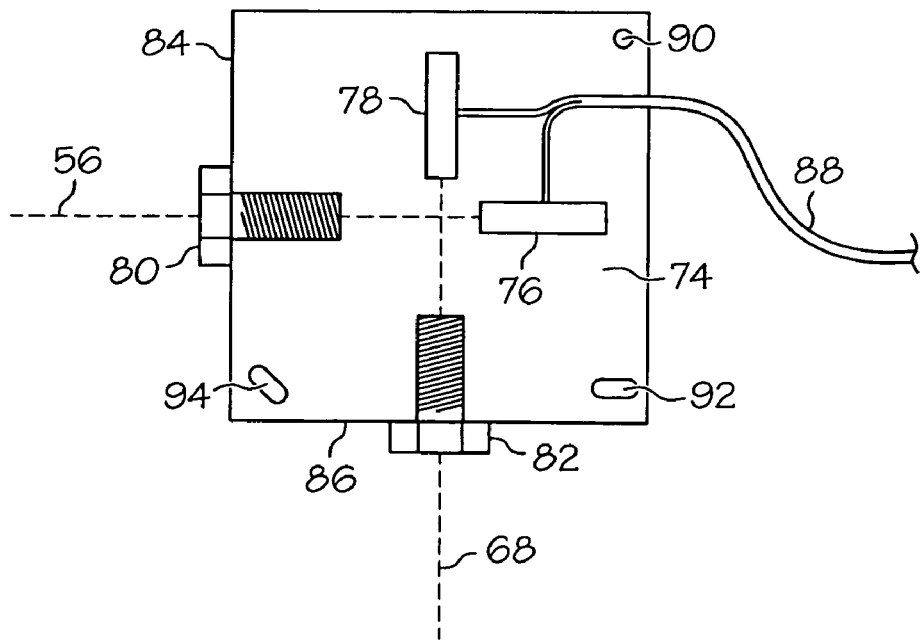
FIG. 6 is a plan view of the positioning device of FIG. 5 with the top wall removed to show the interior arrangement.

The structure of a first embodiment of positioning device 54 is shown in FIGS. 5 and 6. A generally rectangular housing 74 contains a pair of laser light beam emitters 76, 78 that fixed in position and that have their axes oriented perpendicular to each other. The laser light beams 56, 68 that emanate from emitters 76, 78, respectively, are also perpendicular to each other and each passes through a respective cover holder 80, 82 that is threadedly secured to a respective end wall 84, 86 of the housing. Power is supplied to the laser beam emitters from a suitable 12-volt DC power source (not shown) through a branched conduit 88. The power source can include a regulated power supply (not shown), such as a 3-volt regulated power supply, as necessary to regulate the magnitude of the voltage required for the proper operation of the laser beam emitters.

Housing 74 includes three openings 90, 92, 94 through which respective securing bolts or screws can pass to attach the housing to an outermost end of an extendable member, such as an aerial ladder. Opening 90 is circular to provide a fixed connection point and openings 92 and 94 are each slotted to allow some limited degree of pivoting of the housing about the axis of circular opening 90 to enable an angular position adjustment of the emitted perpendicular laser light beams relative to the longitudinal axis of the extendable member.

Figure 7:
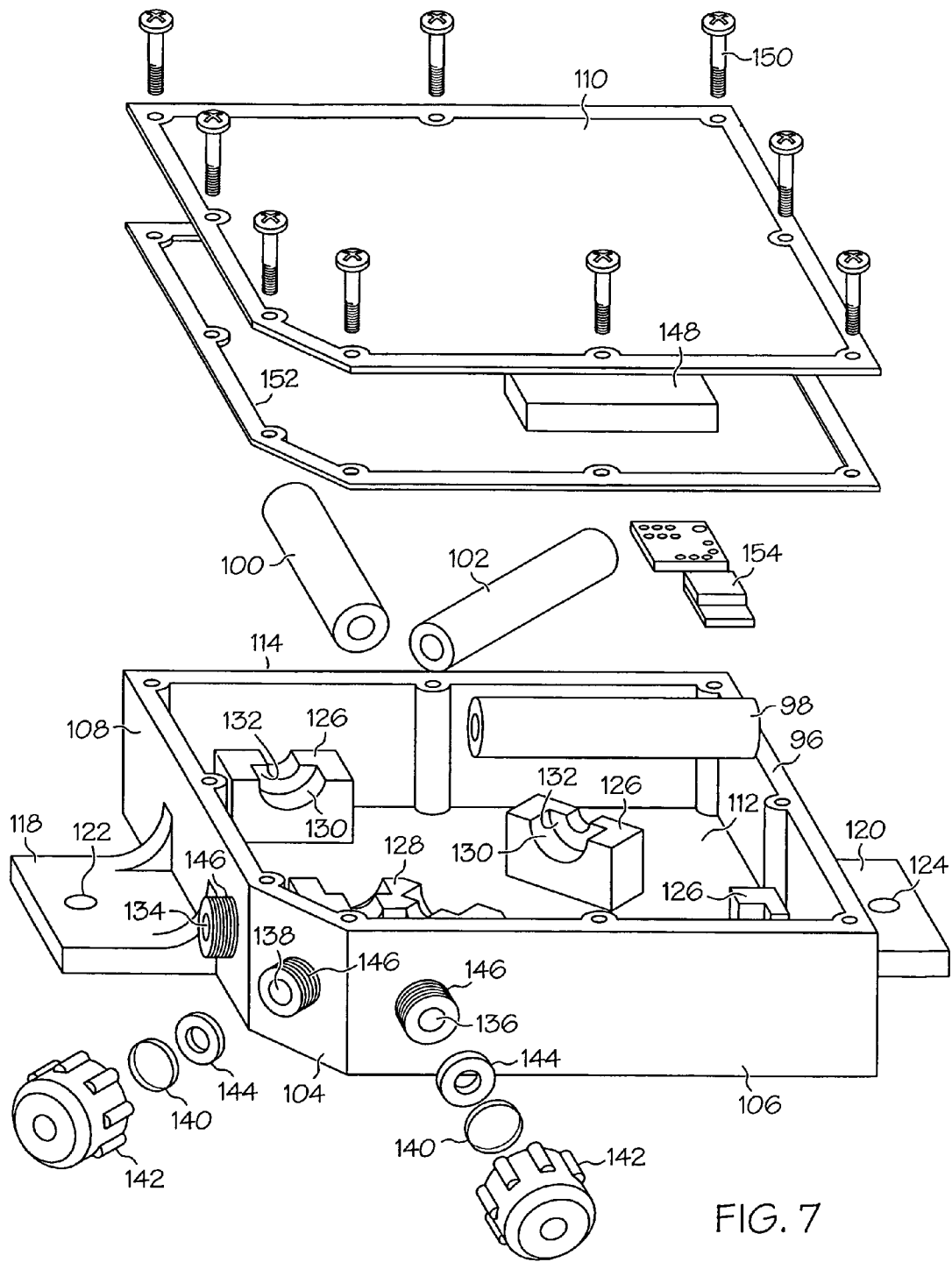
FIG. 7 is an exploded perspective view of a second embodiment of a positioning device in accordance with the present invention.
Figure 8:
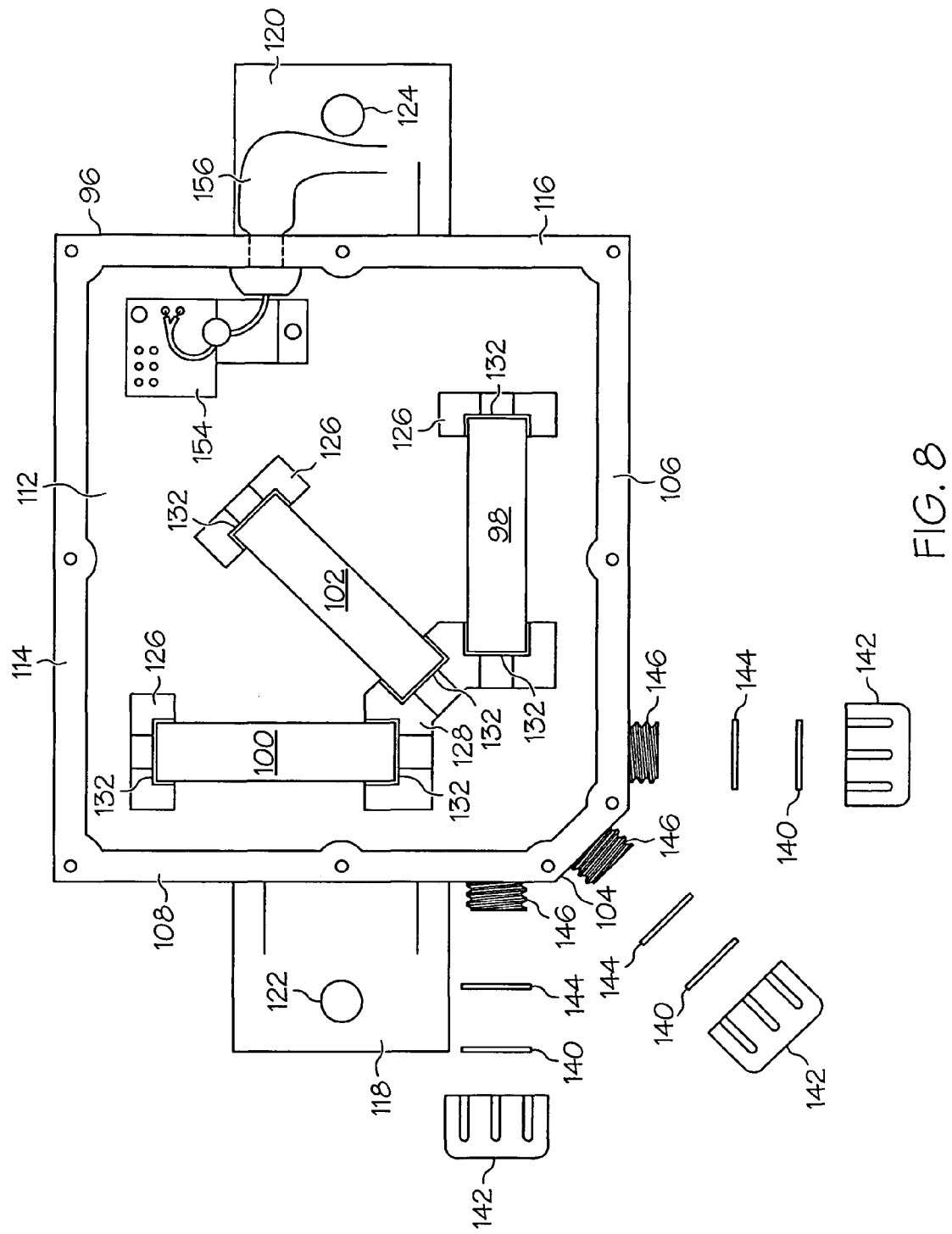
FIG. 8 is a plan view of the embodiment shown in FIG. 7 with the to wall removed to show the interior arrangement.

FIG. 7 is an exploded perspective view of a second embodiment of a positioning device and FIG. 8 is a partially exploded top view thereof. The second embodiment includes a housing 96 that contains three laser beam emitters 98, 100, 102, of which emitters 98 and 100 are oriented perpendicular to each other, as in the first embodiment, and a third emitter 102 that is positioned at a 45° angle to each of first and second emitters 98, 100. Third emitter 102 is disposed so that the laser light beam that is emitted bisects the right angle defined by first and second emitters 98, 100. Housing 96 has a chamfered corner 104 through which the third laser light beam passes, while the first and second laser light beams emanate from the housing through perpendicular sidewalls 106, 108, respectively. Each of the laser light beams lies in a common plane that is parallel to top wall 110 and bottom wall 112 of housing 96.

Housing 96 is a tray-like structure, including bottom wall 112 with upstanding sidewalls 104, 106, 108, 114, and 116, and has an open top. Housing 96 includes a pair of opposed, laterally-extending attachment flanges 118, 120 with respective openings 122, 124 for receiving attachment bolts or screws to attach the housing to an extendable member. As was the case with the first embodiment, one of openings 122, 124 can be a slotted opening to allow angular orientation of housing 96 for a desired directional orientation of the respective emitted laser beams.

Each of laser light beam emitters 98, 100, 102 within housing 96 is received on respective bosses 126, 128 that extend upwardly from bottom wall 112. Bosses 126, 128 include respective aligned, curved recesses 130 each having a respective end wall 132 to receive the respective laser light emitters and to thereby orient and align the emitted laser light beams relative to respective openings 134, 136, 138 in the housing side walls. A clear, transparent Lexan plastic cover 140 is positioned over each of the housing openings to prevent the entry of foreign matter into the interior of housing 96 and to allow the laser light beams to pass therethrough. Each cover 140 is retained relative to it associated opening by a cover cap 142 and sealing gasket 144, for water resistance, wherein the cover cap is threadedly attached to a threaded hollow boss 146 that extends outwardly from the housing side wall.

The retention of the respective laser light beam emitters 98, 100, 102 to the respective bosses 126, 128 is effected by a foam rubber retainer 148, only one of which is shown in FIG. 7. Retainers 148 overlie the respective emitters and include a pressure-sensitive adhesive on the upwardly-facing upper surface for attachment to top wall 110. Housing 96 is closed by top wall 110 that is secured to it by respective attachment screws 150 and an intervening sealing gasket 152. When top wall 110 is assembled to housing 96 by screws 150, the top wall presses each of the foam rubber retainers 148 against an associated laser light emitter to securely hold the respective emitters in their operative positions against bosses 126, 128. Sealing gasket 152 provides a sealed, water resistant housing that protects the laser beam emitters and the regulated power supply element 154, which is connected to an input wiring grommet 156.

A suitable 12 volt power supply for providing power to the laser emitters is an Austin Lynx SMT non-isolated power module manufactured by Lineage Power Corporation, of 3000 Skyline Drive, Mesquite, Tex. 75149. That module provides a precisely regulated output voltage that is programmable over an input voltage range of between 10-14 volts DC by means of a suitably sized external resistor.

Figure 9:
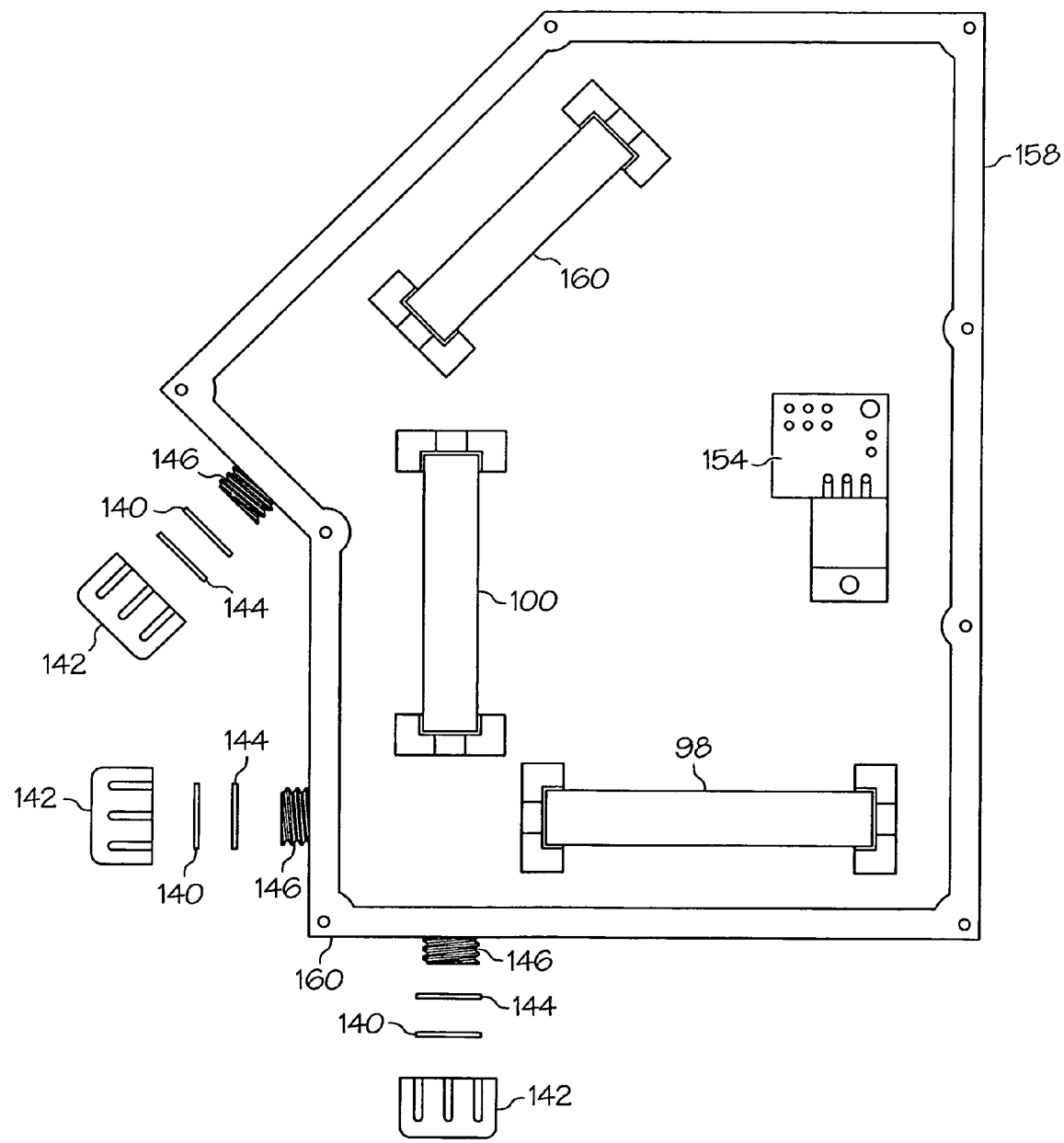
FIG. 9 is a plan view of a third embodiment of a positioning device in accordance with the present invention with the top wall removed to show the interior arrangement.

FIG. 9 is a top plan view of a third embodiment of a positioning device in accordance with the present invention, similar to that of FIGS. 7 and 8 with the top wall removed to show the interior arrangement of the three laser light emitters. The general structure of housing 158 and the laser light emitter retention arrangement within the housing is structurally similar to that of the second embodiment shown in FIGS. 7 and 8. The primary difference between the second and third embodiments is that in the third embodiment two laser light emitters 98, 100 are disposed in perpendicular arrangement as in the second embodiment, but they are disposed adjacent to and on each side of a right-angled corner 160 of housing 158, rather than on opposite sides of the chamfered corner 104 of housing 96 shown in FIGS. 7 and 8. The third laser light emitter 160 is angularly arranged relative to the first and second emitters, similar to the angular arrangement of emitter 102 of the second embodiment, but it is laterally offset from and on one side of the first and second emitter array, and it does not bisect the right angle defined by the laser beams emitted by the first and second emitter array.

The FIG. 9 embodiment is useful if the extendable member is oriented substantially parallel to the ground and is extended toward a perpendicular, or nearly perpendicular, surface, such as wall. Laser emitter 98 is oriented so that the emitted beam is aligned with the direction of movement of the extendable member. The beam from emitter 98 is directed at a point on the surface toward which the extendable member is to be extended. As extension of the member proceeds, the beam from laser emitter 160 moves along the ground toward the target surface, ultimately reaching the surface and moving up along the surface toward the point at which the beam from emitter 98 impinges, to provide to the operator a visual indication that the end of the extendable member is approaching the target.

Figure 10:
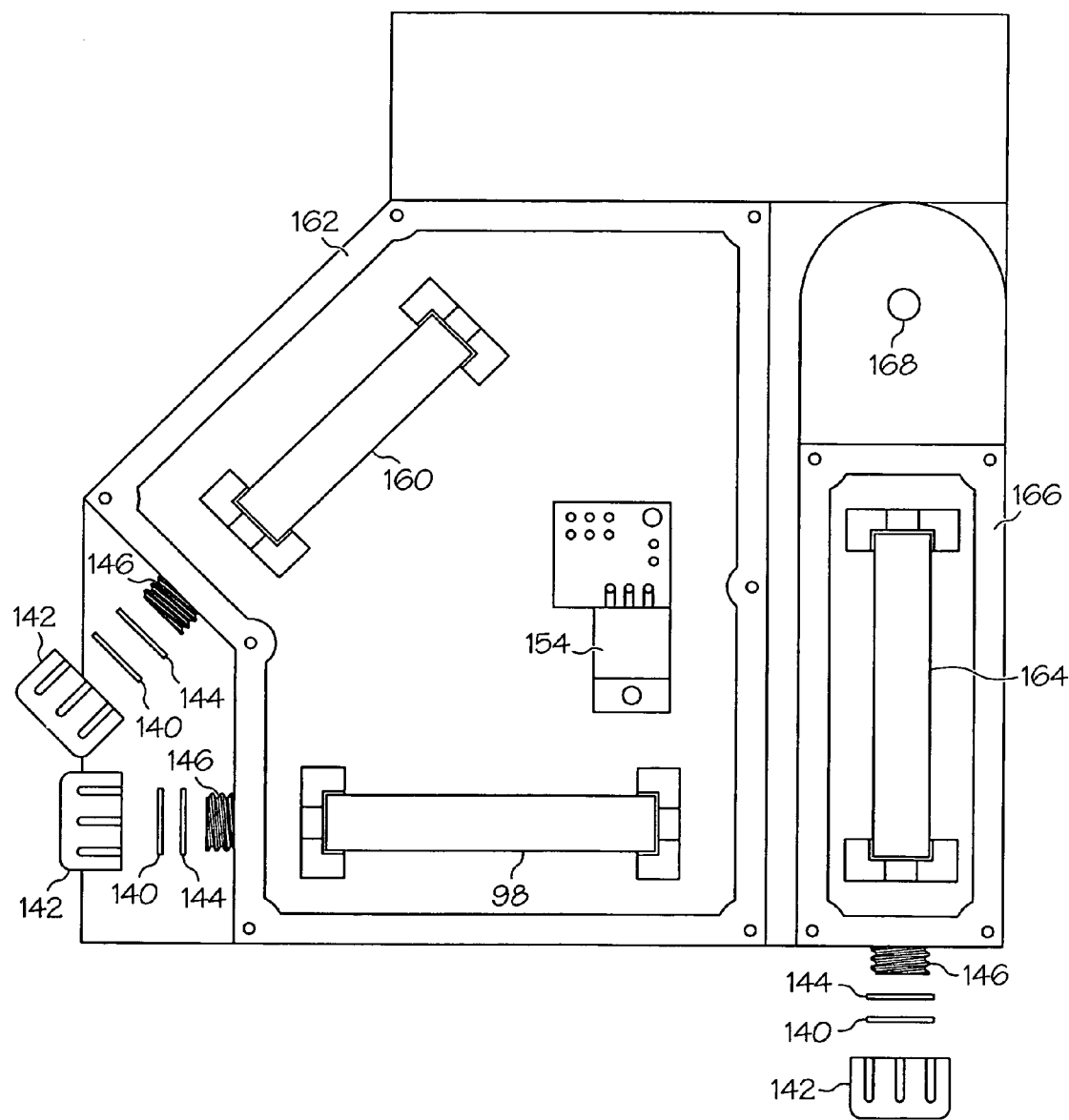
FIG. 10 is a plan view of a fourth embodiment of a positioning device in accordance with the present invention with the top wall removed to show the interior arrangement.

FIG. 10 is a top plan view of a fourth embodiment of a positioning device in accordance with the present invention, again with the top wall removed to show the interior arrangement of the laser light emitters. In this embodiment housing 162 is of generally triangular form within which two laser light emitters 98, 160 are positioned adjacent a corner of the housing so that the emitted laser beams are at a 45° angle to define converging and crossing laser light beams. A third laser light emitter 164 is positioned laterally from the first and second emitters to emit a laser light beam that is offset from laser light emitter 98 to extend outwardly from a third side of the housing. The third laser light emitter is housed in a separate enclosure 166 that is pivotably carried by the main housing 162 to pivot about pivot axis 168, to thereby allow the laser light beam from third emitter 164 to always point in a downward direction. This arrangement allows the outermost tip of an extension ladder to be positioned directly over an object, regardless of the angular disposition of the ladder relative to the ground.

Figure 11:
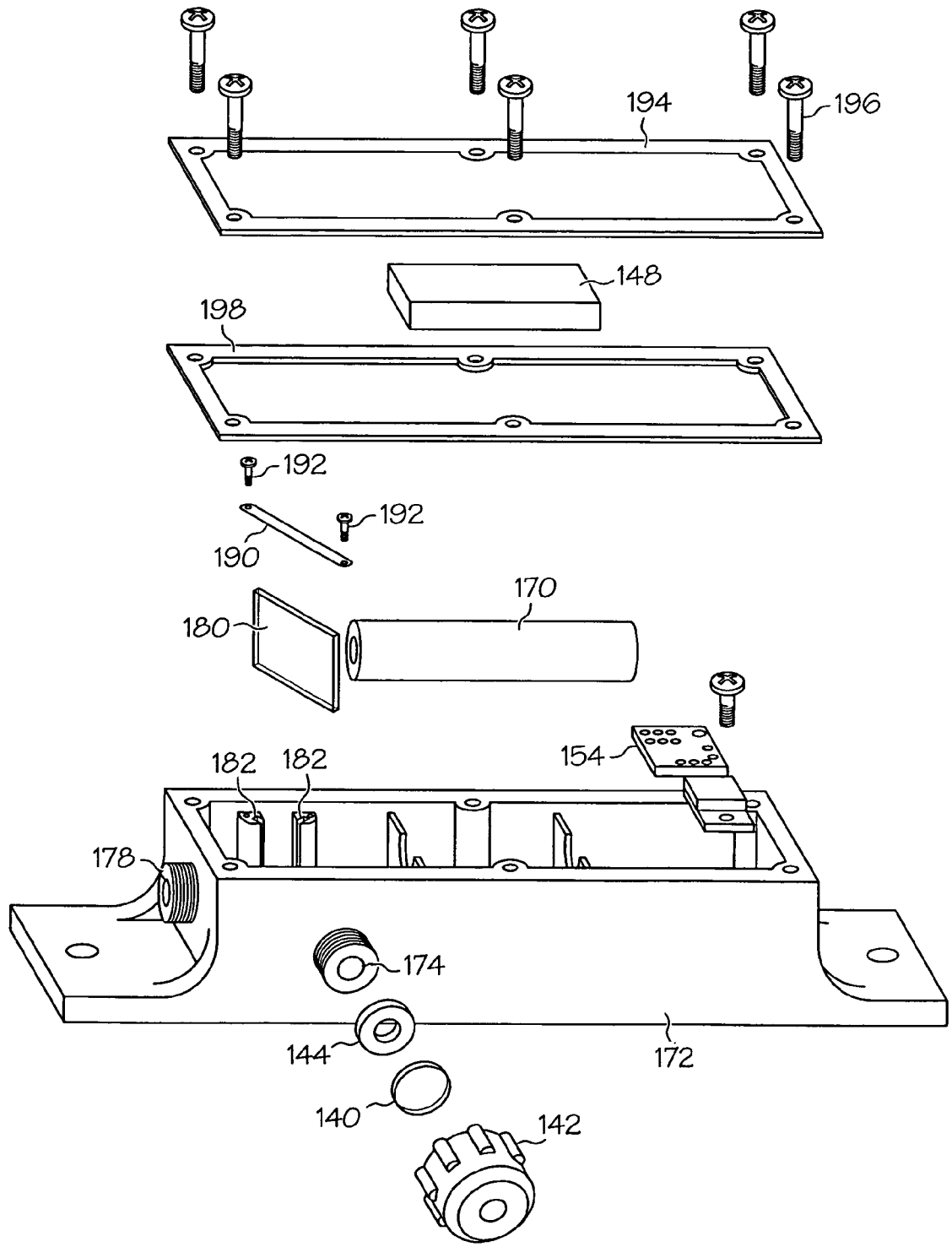
FIG. 11 is an exploded perspective view of a fifth embodiment of a positioning device in accordance with the present invention.
Figure 12:
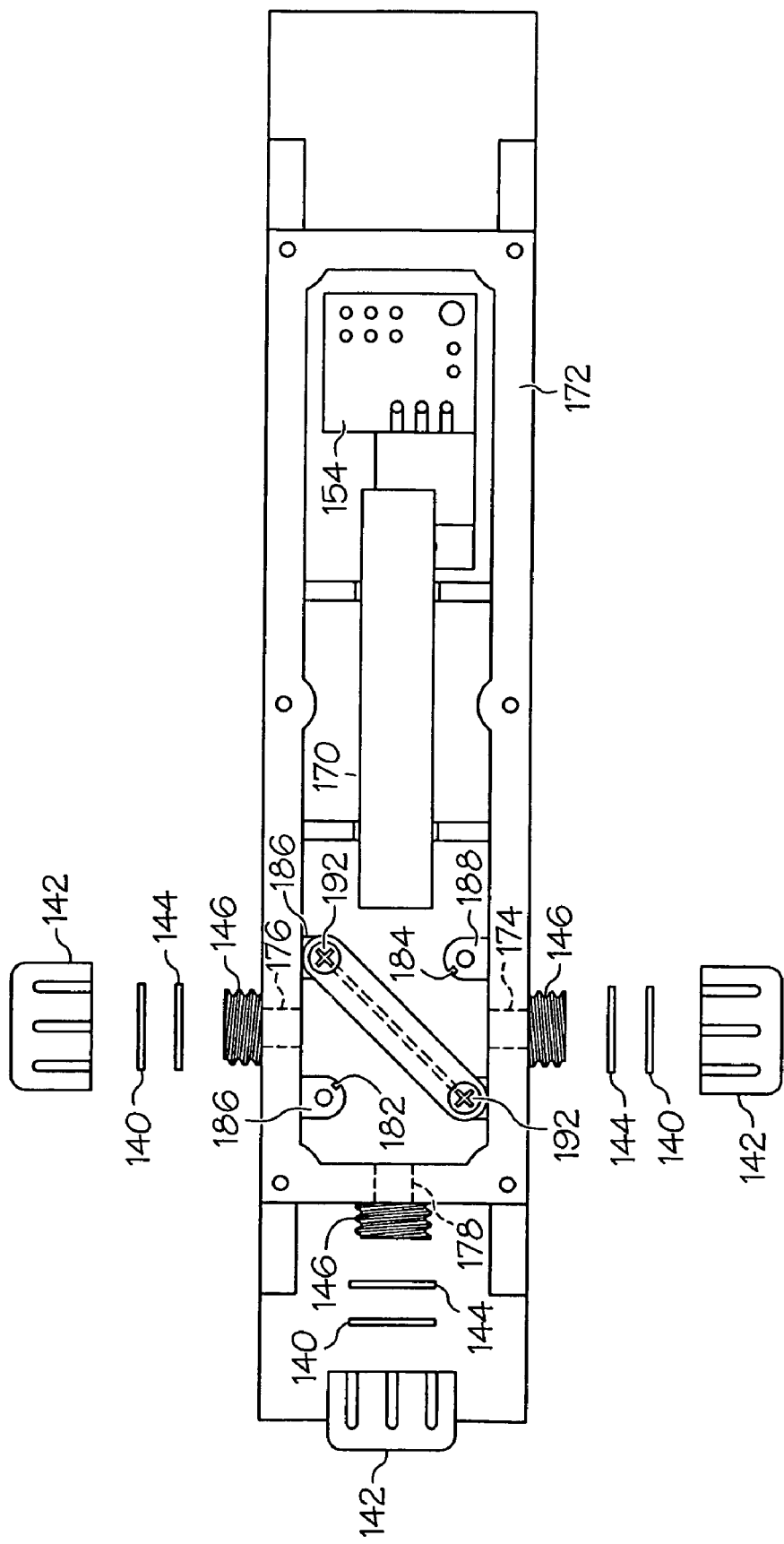
FIG. 12 is a plan view of the embodiment shown in FIG. 11 invention with the top wall removed to show the interior arrangement.

FIGS. 11 and 12 are exploded perspective and partially exploded top plan views, respectively, of a fifth embodiment of the present invention. The fifth embodiment includes a single laser light emitter 170 that is received in an elongated housing 172. Housing 172 includes first and second coaxial openings 174, 176 on respective opposite longer sides of the housing and adjacent one end thereof. A third opening 178 is provided in the end wall of the housing that is closest to first and second openings 174, 176. Positioned within the housing between first and second openings 174, 176, opposite to third opening 178, and oriented at a 45° angle to the axes of each of the respective openings is a semi-transparent mirror 180. Pairs of opposed slots 182, 184 that face each other and that are formed in opposed, inwardly-extending bosses 186, 188 slidably receive semi-transparent mirror 180, which is held in position by an overlying mirror retainer panel 190 that is, in turn, held in position by a pair of screws 192 that are received in bosses 186, 188. Semi-transparent mirror 180 reflects a portion of the laser light beam emanating from laser emitter 170 to first opening 174, and it allows a portion of the emitted laser light beam to pass therethrough to third opening 178, thereby providing a pair of perpendicular laser light beams from a single laser emitter.

In FIG. 11 semi-transparent mirror 180 is positioned to provide laser light beams that extend through openings 176 and 178, whereas in FIG. 12 semi-transparent mirror 180 is positioned rotated 90° from the FIG. 11 position, to provide laser light beams that extend through openings 174 and 178. Housing 172 is closed by cover 194 that carries foam retainer 148 to contact laser emitter 170 when the cover is connected to housing 172 by screws 196, and includes an intervening sealing gasket 198.

Figure 13:
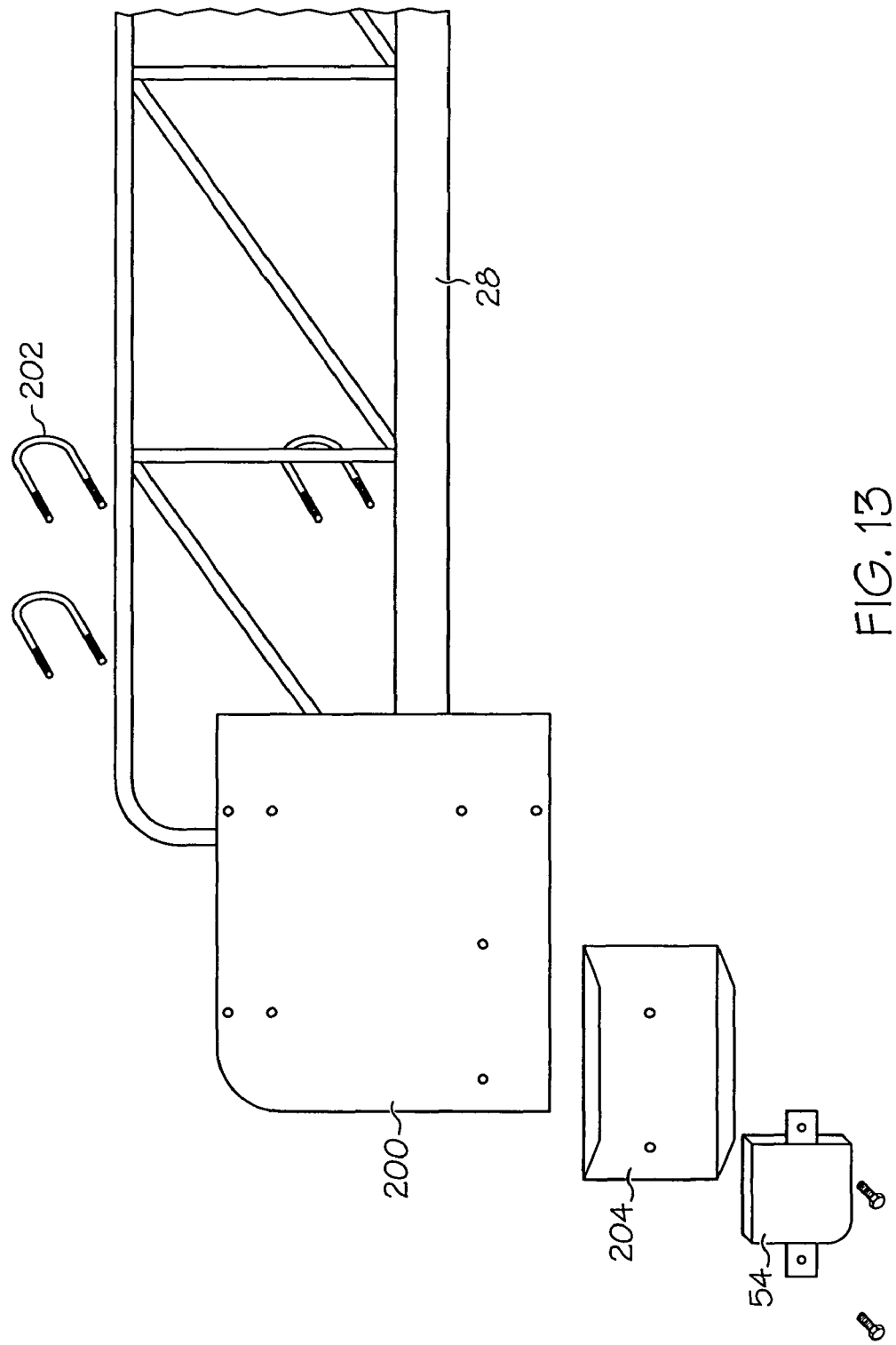
FIG. 13 is an exploded view showing one form of attachment arrangement for attaching a positioning device in accordance with the present invention at the outermost end of an extendable ladder.

FIG. 13 shows one form of attachment arrangement for attaching a positioning device in accordance with the present invention to the outermost end of an extension ladder. A base plate 200 is attached at the outermost end to the rails of upper, fly section 28 of the aerial ladder by a series of U-bolts 202. An intervening guard plate 204 is bolted to base plate 200, and positioning device 54 is bolted to guard plate 204.

Finally, the intensity of a laser beam can diminish as the laser is in continuous use for a certain period of time, after which the laser image on the surface to which it is directed could become more difficult to see. But the laser beam intensity, and consequently the laser image that can be seen on the surface, can be restored to its previous intensity level after a predetermined rest or "off" period of time. To maintain laser intensity a suitable timer circuit can be added at the power input side of the laser in order to turn off the power to the lasers after a predetermined operating time period, such as during positioning of an aerial ladder. Power can then be automatically restored to the lasers after the predetermined rest or "off" period has elapsed. The incorporation of such a timer circuit would serve to maintain the brightest, most visible laser image on the target surface. The laser device can be so configured as to be controlled by monitoring movement of the extendable member, so that the laser beams are "on" during extendable member movement, and upon cessation of movement the lasers would automatically be turned off. The lasers would automatically be turned on upon resumption of movement of the extendable member and after the predetermined rest or "off" period has elapsed. Timing control can also be arranged to respond to operation of the hydraulic system of an aerial ladder by turning on power to the lasers when movement of the aerial ladder occurs, to maintain power to the lasers for the predetermined operating time period, and then to switch off the power. Power can remain off until hydraulic system operation is once again resumed, at which time the cycle would begin again.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A positioning device for enabling an operator to guide an outer end of a longitudinally movable extendable member having its opposite end adjacent a substantially horizontal surface to a desired position at a substantially vertically-extending surface, said positioning device comprising:
   a housing having first and second openings that have respective axes that are angularly disposed relative to each other, wherein the axes of the openings lie in a common plane;
   a first laser light source positioned within the housing for directing a first laser light beam through the first opening in the housing;
   a second laser light source positioned within the housing for directing a second laser light beam through the second opening in the housing;
   wherein the first laser light source projects the first laser light beam that extends parallel to an intended movement direction of an extendable member to which the positioning device is attached and provides a first predetermined laser light image that impinges on the substantially vertically-extending surface at a desired position on the substantially vertically-extending surface toward which the outer end of the extendable member is intended to be moved, and the second laser light source projects the second laser light beam that provides a second predetermined laser light image on the surface and in a direction that is angularly offset from the direction of the first laser light beam, so that the first and second light images on the surface converge as the end of the extendable member approaches the desired position on the substantially vertically-extending surface; and
   attachment means for attaching the housing to an extendable member.

2. A positioning device in accordance with claim 1, wherein the laser light beams are perpendicular to each other.

3. A positioning device in accordance with claim 1, wherein the laser light beams are at an angle relative to each other that corresponds substantially with an angle that the longitudinal axis of the extendable member makes with a horizontal surface adjacent to which an end of the extendable member rests.

4. A positioning device in accordance with claim 1, wherein the housing includes a third laser light source for directing a third laser light beam that extends at an acute angle to each of the first and second laser light beams.

5. A positioning device in accordance with claim 4, wherein the acute angle is 45°.

6. A positioning device in accordance with claim 5, wherein the third laser light source directs the third laser light beam that bisects the angle between the first and second laser light beams.

7. A positioning device in accordance with claim 5, wherein the third laser light beam is laterally offset from the first and second laser light beams and intersects one of the first and second light beams at an intersection point that is outside the housing.

8. A positioning device in accordance with claim 7, wherein the third laser light beam does not intersect the other of the first and second light beams.

9. A positioning device in accordance with claim 1, wherein the housing is a sealed housing to prevent the entry of foreign matter into the interior of the housing.

10. A positioning device in accordance with claim 1, wherein the housing openings each include a respective transparent lens and a respective sealing ring to prevent to entry through the openings of foreign matter.

11. A positioning device in accordance with claim 1, wherein the laser light sources are green light emitting lasers from which the emitted laser light has a wavelength of 532 nm.

12. A positioning device in accordance with claim 1, wherein the extendable member is an extension ladder.

* * * * *